UNITED STATES PATENT OFFICE.

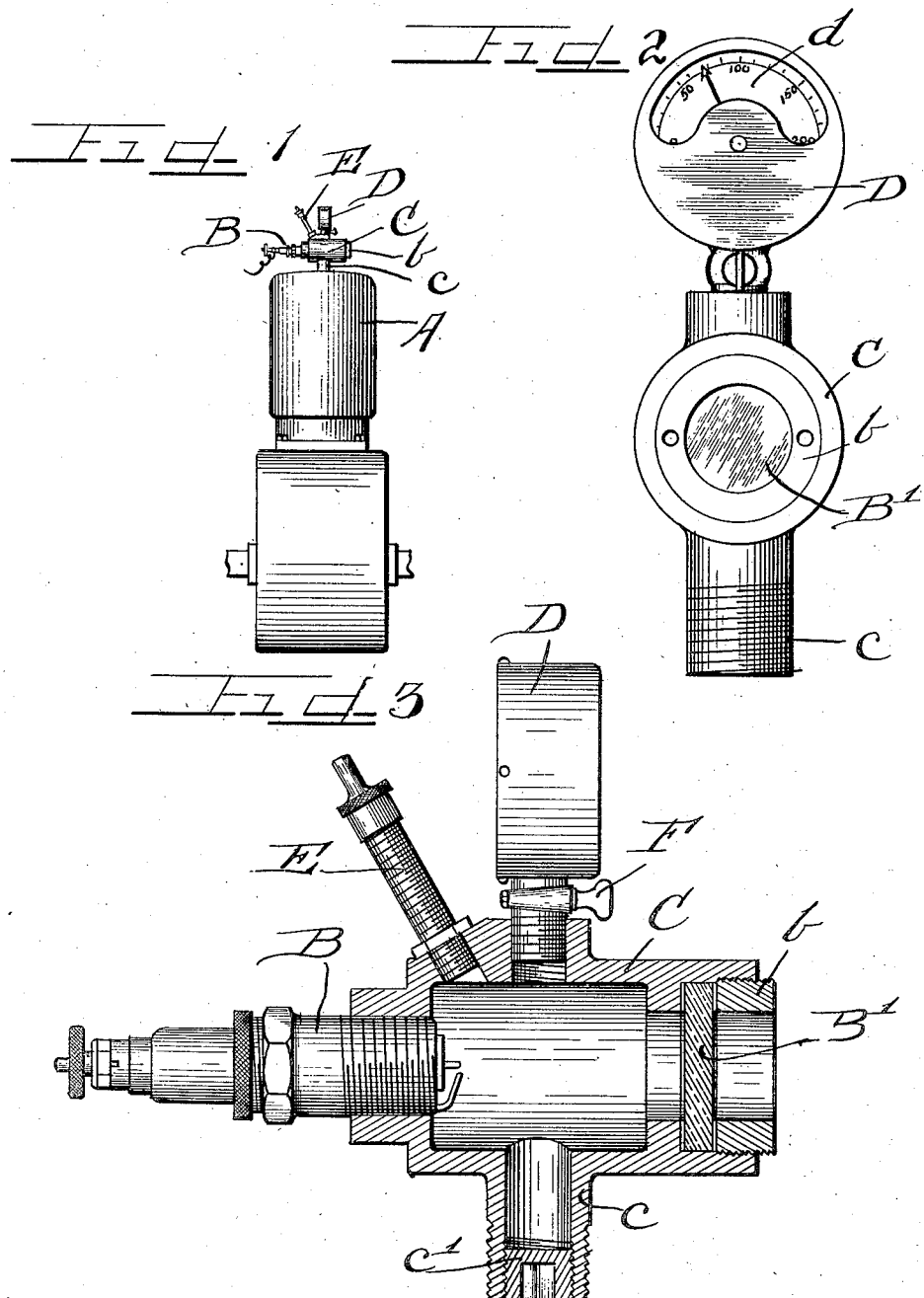

HARVEY R. WILLARD, OF CHICAGO, ILLINOIS.

TESTING DEVICE FOR SPARK-PLUGS.

966,146.  Specification of Letters Patent.  Patented Aug. 2, 1910.

Application filed May 6, 1909. Serial No. 494,365.

*To all whom it may concern:*

Be it known that I, HARVEY R. WILLARD, a citizen of the United States, and a resident of the city of Chicago, in the county of Cook of the State of Illinois, have invented certain new and useful Improvements in Testing Devices for Spark-Plugs; and I do hereby declare that the following is a full, clear, and exact description of the same, reference being had to the accompanying drawings, and to the letters of reference marked thereon, which form a part of this specification.

It frequently occurs in the use of hydrocarbon and internal combustion engines that the spark plug or device for igniting the charge operates imperfectly within the cylinder under service test, although the electrically operating sparking device may operate quite satisfactorily in the open air. This occurs usually owing to the fact that the conductivity of air or vapor varies with the pressure. This is frequently the case with electrical igniting devices for automobile engines and it is not unusual for the operator to find that, although the spark plug apparently gives a satisfactory spark in the open air when testing, it nevertheless fails when full compression is reached in the cylinder with the effect that the engine misses fire. In consequence, vexatious delays are occasioned and much trouble to the operator, inasmuch as the operator usually believes that, inasmuch as the spark plug operates satisfactorily in the open air, the cause resulting in the imperfect working of the engine must be found in some other element, as, for instance, the carbureter or spark coil.

The object of this invention is to afford a testing device for spark plugs whereby the operation of the spark may be observed under actual test conditions as to pressure.

It is also an object of the invention to afford a testing device adapted for use in connection with a spark plug to support and hold the same during testing and to afford a compression reservoir provided with a view aperture in which the passage of the spark may be observed.

It is also an object of the invention to afford a construction in which the pressure to which the electrodes of the spark plug may be subjected can be varied to any desired atmospheric or mixture pressure and to afford means for varying the pressure within the testing device as desired.

The invention also embraces an auxiliary testing support for the spark plug provided with a chamber adapted to communicate, if desired, with the interior of the cylinder and provided with a gage whereby the compression of the cylinder may be tested.

The invention embraces an exceedingly cheap, simple and novel device possessing many important features and consists in the matters hereinafter described and more fully pointed out and defined in the appended claims.

In the drawings: Figure 1 is a view in elevation of an internal combustion engine showing a device embodying my invention attached thereto for testing the plug. Fig. 2 is an end elevation of the testing device. Fig. 3 is a central vertical section thereof showing the gage, valve tube and spark plug in elevation.

As shown in the drawings: A, indicates the cylinder of any hydro-carbon or internal combustion engine screwed in the plug aperture of which is the testing device into which the spark plug B, may be screwed preparatory to testing the same. Said testing device embraces a cast metal or other suitable casing C, affording an interior compression chamber and into which at one end is screwed the spark plug B, and in the other end of which is inserted a plate $B^1$, of plate glass, mica or other transparent material suitably packed to prevent the escape of air under compression or of the mixture, and against which fits an annular follower nut $b$, thereby affording in said end of the chamber a view aperture.

A tubular stem $c$, extends downwardly from the middle portion of said casing and communicates in the internal chamber and at its lower end is threaded complementally with the threaded aperture for the spark plug in the cylinder to permit the same to be secured therein when in use, and, as shown, a removable plug $c^1$, is threaded into said tubular stem to entirely close the same when it is desired to use the device under other pressure than the explosive mixture and without attaching the same to an explosive engine.

Threaded into a suitable aperture in the top of said casing C, is a pressure gage D, of any desired type whether recording or otherwise, and the dial $d$, of which conveniently is turned toward the end of said casing, in which is the view aperture. Also threaded into a suitable aperture (conveniently in the top of the casing and at the back of the gage) is an air valve E, adapted to permit of engagement with any suitable air pump, such, as for instance, an automobile tire pump to permit the pressure in said chamber to be increased to approximately correspond with the pressure of the mixture in the cylinder when under full compression.

The operation is as follows: When it is desired to test a spark plug, the spark plug is removed from the cylinder and the stem of the casing threaded therein, as shown in Fig. 1, with the plug $c^1$, in place, if the test is to be made with compressed air. The spark plug is then screwed into the end of the casing, as shown in Figs. 1 and 3, and suitable pressure established by means of an air pump or any suitable source of pressure. The pressure in the interior chamber is brought to correspond approximately or to a point somewhat above the maximum pressure in the engine cylinder under full compression. If the spark passes regularly and properly under such conditions, it may quite safely be assumed that it will pass under the same conditions within the engine cylinder, and if not, it is evident that the defect is either in the insulation of the spark plug, in the coil, or in the electrical source of energy with a battery or other device, and the repairs or adjustments may be made accordingly.

Should it be desired to test under the actual service conditions with the explosive mixture, the plug $c^1$, may be removed from the tubular stem before securing the testing device in place, in which event, of course, the mixture from the cylinder fills the chamber (and the chamber being of relatively small size) at approximately the same pressure as the normal pressure within the cylinder at full compression. If at sparking position the spark passes, ignition of the charge takes place as is usual and may be readily observed inasmuch as the transparent medium $B^1$, inserted in the end of the testing device is of sufficient strength to withstand the explosion of the charge without injury.

Of course, where testing with the explosive mixture under pressure, it may be desirable to provide a shut-off valve to prevent the pressure due to ignition of the charge from acting on the indicator. A valve F, is provided in the pipe leading to the gage to protect the gage from the severe shock occasioned by the explosion. Preferably, the gage and valve stem are connected oppositely in the casing from the stem $c^1$, the more readily to permit the device to be packed in small spaces.

Of course, variations in construction may be effected and I have shown but one of several possible constructions embodying my invention. I therefore do not purpose limiting this application for patent otherwise than necessitated by the prior art.

I claim as my invention:

1. A testing device of the class described affording a small interior pressure chamber having a view aperture closed by a transparent medium, a gage connected in said pressure chamber, a threaded aperture opening into said chamber to receive the spark plug to be tested, a threaded stem adapted to fit in the spark plug aperture in an engine and a valve for cutting off communication between the pressure chamber and gage.

2. A device of the class described embracing a strong casing affording a small interior chamber, a transparent section in one of the walls of the casing, a threaded aperture opening thereinto opposite the transparent section and adapted to receive the sparking end of a spark plug therein, a gage connected in the chamber, a threaded tubular stem communicating in the chamber and adapted to thread into the plug aperture in an engine cylinder, a removable plug fitted in the bore of said stem and an air valve connected in said casing and adapted to afford connection with a source of pneumatic pressure.

3. A testing device for spark plugs embracing a casing affording a small interior chamber, and into which the sparking end of a spark plug may be threaded, a gage connected in the chamber, means admitting pressure into the chamber, and a threaded stem adapted to engage in the plug aperture in the cylinder.

4. A cylindric casing having an internally threaded aperture at one end to receive a spark plug, and at the other end to afford a view aperture, a transparent medium in said view aperture, a gage connected in the top of said casing, a tubular, normally closed stem opening into the side of said casing and adapted to be threaded into the plug aperture in the cylinder and to afford a support for the casing and plug during testing, and a cock connected in the gage.

5. In a device of the class described a casing having a threaded aperture to receive a spark plug, means for admitting air pressure into the casing, means for connecting the casing with the combustion chamber of an engine, a gage adapted to communicate with the casing and means for cutting off communication between the gage and casing when the casing is connected with the combustion chamber of the engine.

In testimony whereof I have hereunto subscribed my name in the presence of two subscribing witnesses.

HARVEY R. WILLARD.

Witnesses:
LAWRENCE REIBSTEIN,
K. E. HANNAH.